(12) United States Patent
Rath et al.

(10) Patent No.: US 12,262,050 B2
(45) Date of Patent: Mar. 25, 2025

(54) INTRA PREDICTION FOR VIDEO ENCODING AND DECODING

(71) Applicant: InterDigital CE Patent Holdings, SAS, Cesson-Sevigne (FR)

(72) Inventors: Gagan Rath, Bretagne (FR); Fabrice Urban, Thorigne Fouillard (FR); Fabrice Le Leannec, Betton (FR); Fabien Racape, San Francisco, CA (US)

(73) Assignee: InterDigital CE Patent Holdings, SAS, Paris (FR)

( * ) Notice: Subject to any disclaimer, the term of this patent is extended or adjusted under 35 U.S.C. 154(b) by 425 days.

(21) Appl. No.: 17/619,446

(22) PCT Filed: Jun. 22, 2020

(86) PCT No.: PCT/EP2020/067318
§ 371 (c)(1),
(2) Date: Dec. 15, 2021

(87) PCT Pub. No.: WO2020/260188
PCT Pub. Date: Dec. 30, 2020

(65) Prior Publication Data
US 2022/0312034 A1    Sep. 29, 2022

(30) Foreign Application Priority Data

Jun. 24, 2019   (EP) ..................... 19305824

(51) Int. Cl.
*H04N 19/593*    (2014.01)
*H04N 19/105*    (2014.01)
(Continued)

(52) U.S. Cl.
CPC ......... *H04N 19/593* (2014.11); *H04N 19/105* (2014.11); *H04N 19/11* (2014.11); *H04N 19/59* (2014.11)

(58) Field of Classification Search
CPC ...... H04N 19/593; H04N 19/59; H04N 19/11; H04N 19/105; H04N 19/176; H04N 19/80
See application file for complete search history.

(56) References Cited

U.S. PATENT DOCUMENTS

2017/0251224 A1* 8/2017 Lee ..................... H04N 19/187

OTHER PUBLICATIONS

Elyousfi et al., "Fast Intra Prediction Algorithm for H.264/AVC Based on Quadratic and Gradient Model", International Journal of Electrical and Electronics Engineering 4:1. (Year: 2010).*
(Continued)

*Primary Examiner* — Kathleen V Nguyen
(74) *Attorney, Agent, or Firm* — Condo Roccia Koptiw LLP

(57) ABSTRACT

Decoding or encoding picture information can involve determining a value associated with a prediction of a pixel of a block of picture information, wherein, the prediction is based on an intra-prediction along a non-diagonal direction, determining, from among a plurality of decoded pixels neighboring the block on the top and the left, at least four reference samples for the block based on the non-diagonal direction, and wherein the determining of the value comprises an interpolation based on a quadratic model and the four reference samples; and decoding or encoding at least a portion of the picture information based on the value.

18 Claims, 8 Drawing Sheets

(51) Int. Cl.
  *H04N 19/11* (2014.01)
  *H04N 19/59* (2014.01)

(56) References Cited

OTHER PUBLICATIONS

Van Der Auwera, et al., "Description of Core Experiment 3: Intra Prediction and Mode Coding", Joint Video Experts Team (JVET) of ITU-T SG 16 WP 3 and ISO/IEC JTC 1/SC 29/WG 11, Document: JVET-K1023-v3, 11th Meeting, Ljubljana, Slovenia, Jul. 10, 2018, 35 pages.
Tian et al., "Adaptive Intra Mode Decision for HEVC based on Texture Characteristics and Multiple References Lines", Springer Science & Business Media, Multimedia Tools and Applications, vol. 78, No. 1, Apr. 23, 2018, 22 pages.
Elyousfi et al., "Fast Intra Prediction Algorithm for H.264/AVC Based on Quadratic and Gradient Model", International Journal of Electrical and Electronics Engineering 4:1, 2010, 9 pages.
Jong-Tzy et al., "Intra Frame Interpolation with H.264 Intra Prediction Method", Institute of Electrical and Electronic Engineers (IEEE), Proceedings of the Ninth International Conference on Machine Learning and Cybernetics, Qingdao, China, Jul. 11, 2010, 7 pages.

\* cited by examiner

INTRA PREDICTION FOR VIDEO ENCODING AND DECODING

CROSS REFERENCE TO RELATED APPLICATIONS

This application is a National Stage Entry under 35 U.S.C. § 371 of Patent Cooperation Treaty Application No. PCT/EP2020/067318, filed Jun. 22, 2020, which claims the benefit of European Patent Application No. 19305824, filed Jun. 24, 2019, the contents of all of which are hereby incorporated herein by reference in their entirety.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding. Various modifications and embodiments are envisioned as explained below that can provide improvements to a video encoding and/or decoding system including but not limited to one or both of increased compression or coding efficiency and decreased complexity.

SUMMARY

In general, an example of an embodiment can involve a method comprising: determining a value associated with a prediction of a pixel of a block of picture information, wherein, the prediction is based on an intra-prediction along a non-diagonal direction, determining, from among a plurality of decoded pixels neighboring the block on the top and the left, four reference samples for the block based on the non-diagonal direction, and wherein the determining of the value comprises an interpolation based on a quadratic model and the four reference samples; and decoding at least a portion of the picture information based on the value.

In general, another example of an embodiment can involve a method comprising: determining a value associated with a prediction of a pixel of a block of picture information, wherein, the prediction is based on an intra-prediction along a non-diagonal direction, determining, from among a plurality of pixels neighboring the block on the top and the left, four reference samples for the block based on the non-diagonal direction, and wherein the determining of the value comprises an interpolation based on a quadratic model and the four reference samples; and encoding at least a portion of the picture information based on the value.

In general, another example of an embodiment can involve apparatus comprising: one or more processors configured to determine a value associated with a prediction of a pixel of a block of picture information, wherein, the prediction is based on an intra-prediction along a non-diagonal direction, determine, from among a plurality of decoded pixels neighboring the block on the top and the left, four reference samples for the block based on the non-diagonal direction, and wherein the one or more processors being configured to determine the value comprises the one or more processors being further configured to perform an interpolation based on a quadratic model and the four reference samples; and decode at least a portion of the picture information based on the value.

In general, another example of an embodiment can involve apparatus comprising: one or more processors configured to determine a value associated with a prediction of a pixel of a block of picture information, wherein, the prediction is based on an intra-prediction along a non-diagonal direction, determine, from among a plurality of pixels neighboring the block on the top and the left, four reference samples for the block based on the non-diagonal direction, and wherein the one or more processors being configured to determine the value comprises the one or more processors being further configured to perform an interpolation based on a quadratic model and the four reference samples; and encoding at least a portion of the picture information based on the value.

In general, another example of an embodiment can involve a bitstream formatted to include picture information, wherein the picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
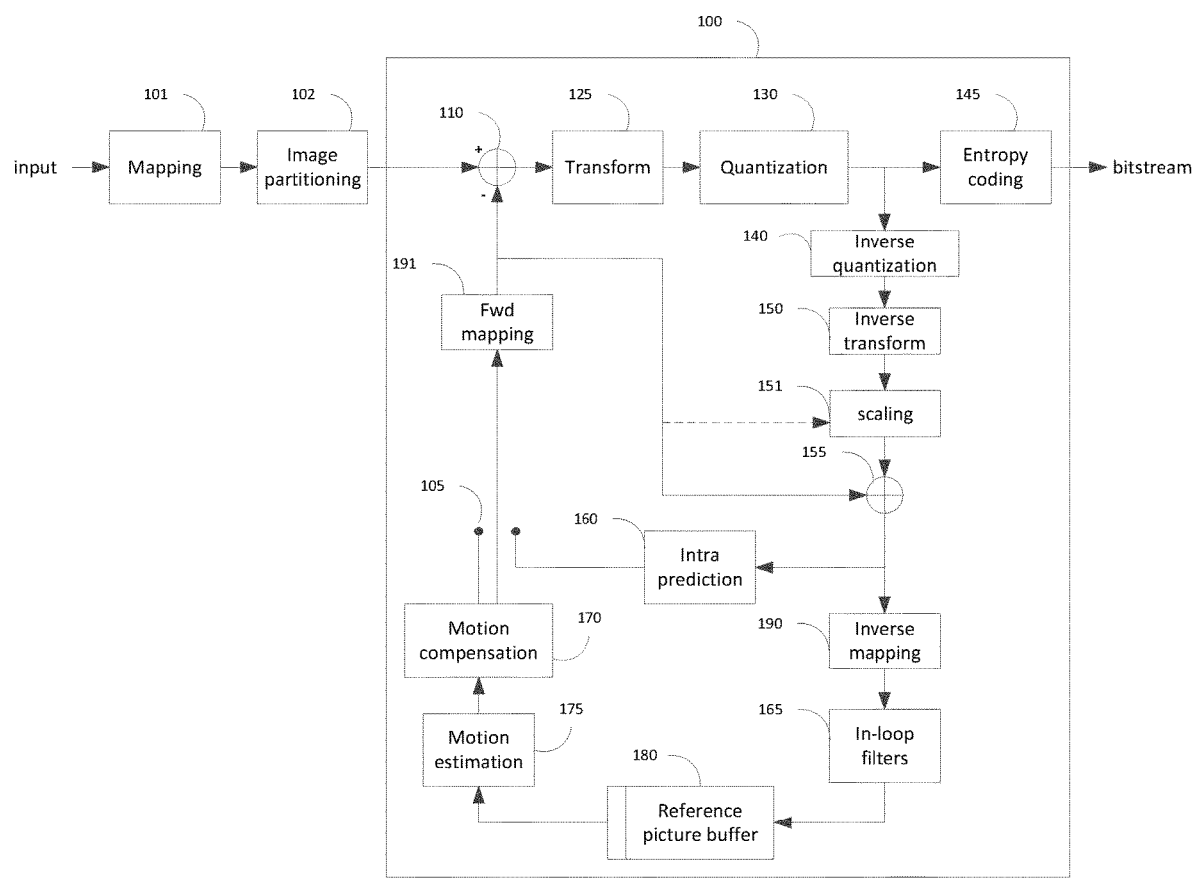
FIG. 1 provides a block diagram depicting an example of an embodiment of a video encoder.

Turning now to the figures, FIG. 1 illustrates an example of a video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

In the present application, the terms "reconstructed" and "decoded" may be used interchangeably, the terms "pixel" and "sample" may be used interchangeably, and the terms "picture" and "frame" may be used interchangeably.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture information to be encoded is provided at the input and undergoes mapping (101) and image partitioning (102). The mapping (101) typically applies per sample and applies a 1D-function to the input sample values to convert them to other sample values. For example, the 1D-function can expand the sample value range and provide for a better distribution of the codewords over the codeword range. The image partitioning (102) splits the image into blocks of different sizes and shapes in order to optimize the rate-distortion tradeoff. The mapping and partitioning enable processing the picture information in units of CUs as described above. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. The intra or inter prediction decision (105) is followed by forward mapping (191) to produce a predicted block. In general, the forward mapping processing (191) is similar to the mapping (101) and can be complementary to the mapping. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The inverse mapping (190) is the inverse of the forward mapping (191). The filtered image is stored at a reference picture buffer (180).

Figure 2:
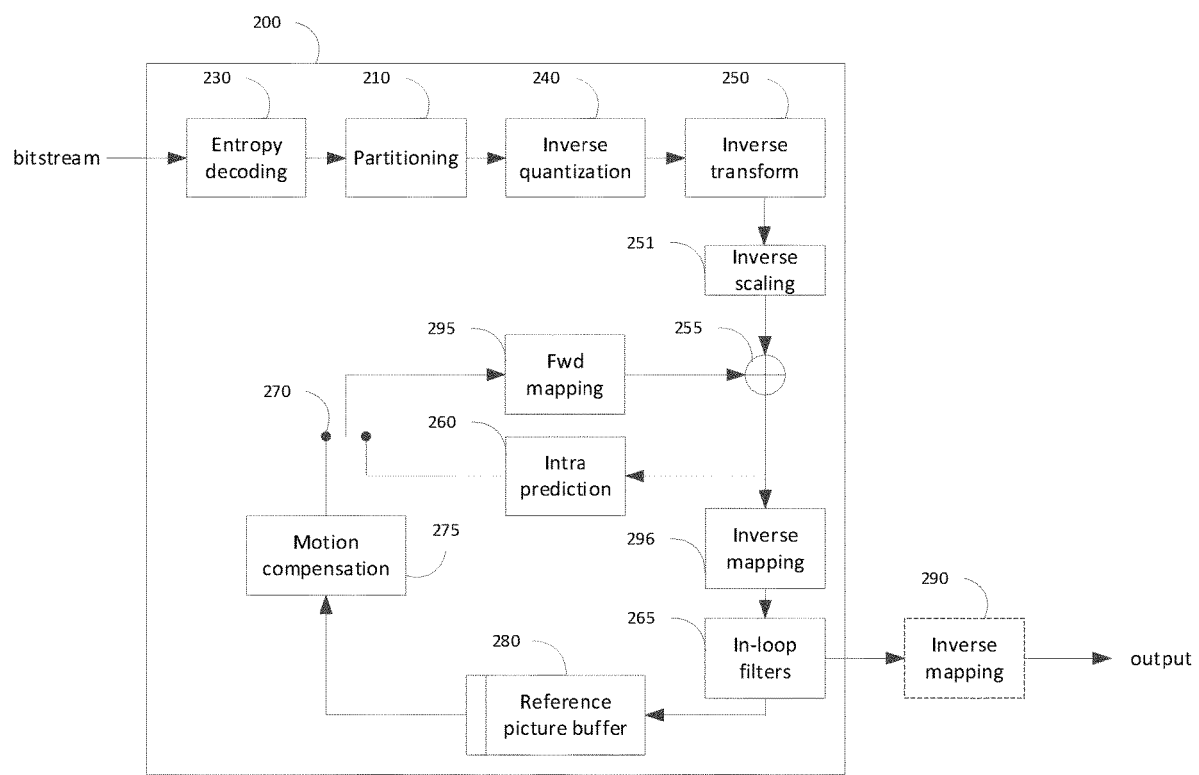
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream that can be generated by a video encoder such as video encoder 100 of FIG. 1. The signal or bitstream is first entropy decoded (230) to obtain transform coefficients, motion vectors, and other coded information. Partitioning (210) divides the image into blocks of different sizes and shapes based on the decoded data. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

In Versatile Video Coding (VVC), a target block is intra predicted either with a non-angular mode such as the PLANAR or the DC, or with one of the several angular modes. In an angular prediction, the predictor samples on the reference arrays are directly copied on to the target pixel positions along the corresponding direction. For non-diagonal directions except the strictly horizontal and strictly vertical modes, the predictor samples are interpolated by filtering the nearest four reference samples with either a cubic or a Gaussian filter in the case of a Luma block. The filters are pre-computed and are stored as two 32×4 arrays, which require memory. Furthermore, as the coefficients are not always powers of two, each target pixel requires four multiplications to compute its prediction. The required complexity can be high for certain low-power and low delay applications.

In general, an aspect of the present disclosure can involve a reduced complexity filtering method for interpolating the predictor values for non-diagonal directions excluding the strictly horizontal and strictly vertical directions. The filtering is still applied to the four nearest samples but, in at least one embodiment, can be based on two linear models, where each model applies to half of the interval. The resulting calculations are much less complex requiring only two multiplications per target pixel. Since models based on four samples are not appropriate for modeling edges of objects, at least one example of an embodiment provides a thresholding method to decide between the proposed model and the linear interpolation with nearest two reference samples. If the prediction requires the usage of pre-filtered reference samples, depending on the prediction direction and block size, e.g., as in HEVC, then at least one example of an embodiment applies a [1 2 1] pre-filter to the nearest two reference samples followed by the above interpolation. Thus, a single unified interpolation method is applied in all cases.

Versatile Video Coding (VVC) defines several prediction modes for intra prediction of a target block. The PLANAR and DC modes aim at modelling gradual and slowly changing intensity regions whereas angular prediction modes aim at modelling directionality in different object structures. Besides the regular 65 angular prediction modes, which span the prediction directions from 45 degree to −135 degree, it also includes several wide angular modes, which have directions beyond the span of regular modes. The wide angular modes are defined only for non-square blocks. For any given target block, an available wide angular mode replaces a regular prediction mode in the opposite direction. Thus, the total number of available prediction modes of a target block remains always 67 (i.e., one PLANAR mode, one DC mode, and 65 angular modes).

To implement these modes efficiently, the VVC reference software designated as Versatile (or VVC) Test Model (VTM) defines two reference arrays: a top reference array consisting of the decoded pixels on the top, the top right and the top-left, and a left reference array consisting of the decoded pixels on the left, the bottom_left and the top_left. For any angular prediction mode, the samples on these reference arrays are copied onto the target block along the corresponding direction. But, as the reference samples are located only at integral positions, except for the modes along diagonal directions (i.e., modes 2, 66 and 34) and the strictly vertical and horizontal modes (i.e., modes 18 and 50), the predicting reference samples for all target pixels do not coincide with actual reference samples. In this case, the predicting samples are interpolated using the neighboring reference samples. In VTM version 5, for a Luma block, a predicting sample is interpolated using the four nearest reference samples, two on either side of its position on the reference array. For a Chroma block, the predicting sample is linearly interpolated using the two nearest reference samples, one on either side of its position on the reference array.

Though interpolation with four reference samples yields more accurate values, the resulting complexity is much higher. Earlier versions of VTM used only linear interpolation with the two nearest reference samples, both for Luma and Chroma target blocks. A linear interpolation is a weighted sum and can be effectively implemented with only one multiplication and two addition operations. On the contrary, interpolation with four samples is performed with either a cubic filter or a Gaussian filter whose coefficients are pre-computed and stored in memory. Each interpolation thus requires four multiplication and three addition operations.

In general, at least one example of an embodiment described herein provides interpolation methods which also use at least four neighboring reference samples but require less complex operations. In general, in at least one example of an embodiment, the described methods can be applied to both Luma and Chroma target blocks instead of treating them separately.

Regarding intra prediction in VTM 5.0, for a given target block to be intra predicted, the encoder, or the decoder, first constructs two reference arrays, one on the top and the other on the left of the target block. The reference samples are taken from the decoded samples on top, top-right, left, left-bottom and top-left decoded blocks. If some of the samples on the top or the left are not available, because of the corresponding CUs being not in the same slice, or the current CU being at a frame boundary, etc., then a method called reference sample substitution is performed, where the missing samples are copied from the available samples in a clock-wise direction. Both reference arrays are filtered with the low-pass filter [1 2 1]/4, and both the filtered and unfiltered versions are available for prediction. For any prediction mode, either the filtered or the unfiltered reference arrays are used for prediction, but not both. If the prediction mode corresponds to a diagonal direction (i.e., mode 2, mode 66 or mode 34), then the filtered reference arrays are used for prediction. For all other angular prediction modes, the unfiltered reference arrays are used for prediction.

Figure 3:
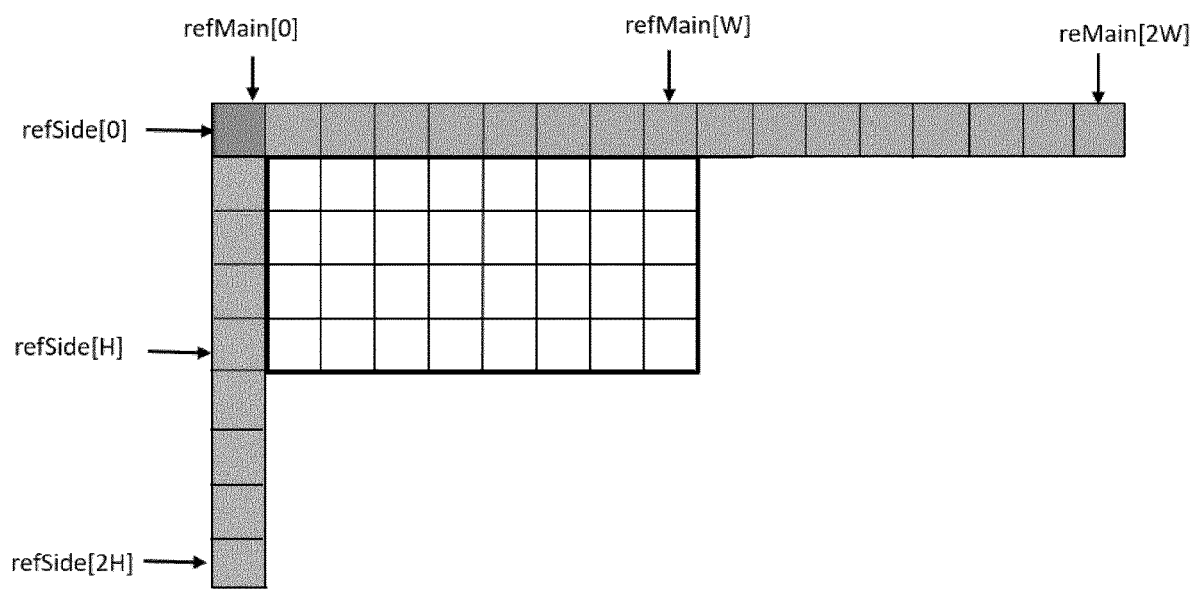
FIG. 3 illustrates an example of reference samples for intra prediction, e.g., for a target block with width W pixels and height H pixels, the top reference array has 2W+1 samples and the left reference array has 2H+1 samples.

For the sake of generality, we will assume a rectangular target block with width W pixels and height H pixels. We will represent the reference arrays on the top and the left as refMain and refSide, respectively. The array refMain has 2*W+1 pixels and they are indexed as refMain[0] to refMain [2W] where refMain[0] corresponds to the top-left reference pixel. Similarly, the array refSide has 2*H+1 pixels and they are indexed as refSide[0] to refSide[2H] where refSide[0] again corresponds to the top-left reference pixel. For the special case of a square block with each side having N pixels, both the reference arrays will have 2N+1 pixels. FIG. 3 illustrates an example of the reference arrays for a rectangular target block.

For positive vertical directions (that is, for modes with indices greater than or equal to 50), only the reference samples from refMain[0] to refMain[2W+1] are needed for prediction. For negative vertical directions (that is, for modes with indices greater than or equal to 34 but smaller than 50), the samples on refSide are projected onto the negative side of refMain to generate the reference samples refMain[−1], refMain[−2] . . . refMain[−k], where refMain [−k] corresponds to the projection of the last reference sample refSide[2H]. The projection is performed using the inverse angle parameter invAngle, corresponding to the angle parameter predIntraAngle associated with the prediction mode. In VVC Test Model VTM, the horizontal prediction modes (the modes with indices greater than 1 and less than 34, i.e., the diagonal mode DIA_IDX) are implemented by swapping the top and the left reference arrays, and the height and the width of the target block. This is done because of the symmetry of the vertical (horizontal) modes about the strictly vertical (horizontal) direction. Throughout the present description, it will be assumed that, for horizontal prediction modes, the refMain and the refSide denote the top and the left reference arrays after they have been swapped.

For any target pixel, the reference sample on refMain will be referred to as its predictor. If the prediction mode is one of the diagonal modes, that is, mode 2, or mode 66, or mode 34, then the predictor for every target sample will coincide with a reference sample. In this case, the corresponding reference sample will be used as the predictor as it is. For all other angular prediction modes, the nearest two or four reference samples of the predictor are used for interpolating the predictor as follows.

Figure 4:
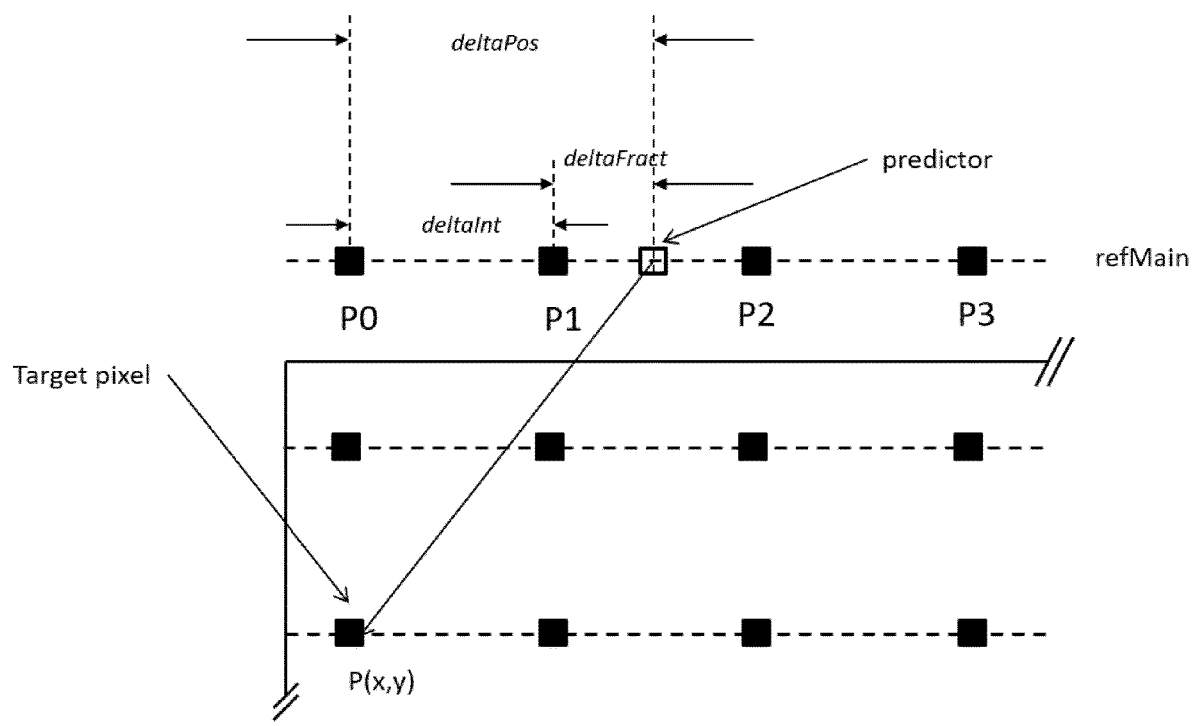
FIG. 4 illustrates an example of interpolation of a predictor for prediction in non-diagonal directions, e.g., P0, P1, P2, and P3 are the nearest reference samples which are used to interpolate the predictor with either a Gaussian or a cubic filter for the Luma component, while for the Chroma component, the predictor is linearly interpolated using P1 and P2.

Let P0, P1, P2, and P3 denote the four reference samples nearest to the predictor sample, as shown in FIG. 4. They are determined as follows. First the integral and the fractional parts of the position of the predictor on refMain are determined. Denoting the horizontal offset of the predictor's position from the target pixel at (x, y) as deltaPos, its integral and fractional parts deltaInt and deltaFract are computed as:

deltaPos=(1+y)*predIntraAngle deltaInt=deltaPos»5;

deltaFract=deltaPos & 31;

Since deltaPos is defined at a resolution of (1/32) of a pixel, deltaInt determines the position of the nearest reference sample on the left, i.e., P1, and deltaFract denotes the distance of the predictor from P1 at resolution (1/32).

Thus, the four reference samples are identified as:

P0=refMain[x+deltaInt],

P1=refMain[x+deltaInt+1],

P2=refMain[x+deltaInt+2],

P3=refMain[x+deltaInt+3], as shown in the FIG. 4. For a Luma target block, the predictor sample value is computed as:

$$P_{pred}(x,y)=(F[0]*P0+F[1]*P1+F[2]*P2+F[3]*P3+32)»6 \quad (1)$$

where F[i] denotes the ith filter coefficient. The filter coefficients F[i]=0, 1, 2, 3, are normalized with integral values so that their sum is equal to 64. The chosen filter depends on the value deltaFract and a boolean parameter called useFilter. If useFilter is enabled, then a Gaussian filter is used, else a cubic filter is used. The value of the useFilter is decided based on several intra prediction parameters such as the block size, the prediction direction, etc. Thus, its value is the same for all target pixels. As the specified cubic filter has both negative and positive coefficient values, when the useFilter is disabled, a clipping operation is additionally performed to keep the predicted value within the valid dynamic range of the Luma component:

$$P_{pred}(x,y)=\text{Clip}((F[0]*P0+F[1]*P1+F[2]*P2+F[3]*P3+32)»6) \quad (2)$$

Since deltaFract has integral values in the range [0-31], VVC specifies 32 Gaussian and 32 cubic filters corresponding to these 32 deltaFract values, which are computed offline and stored in memory.

For a chroma target block, only the two reference samples P1 and P2 are used for interpolating the predictor. The predictor value is linearly interpolated, as in HEVC.

$$P_{pred}(x,y)=((32-\text{deltaFract})*P1+\text{deltaFract}*P2+16)»5; \quad (3)$$

In this case, as the predicted value is a weighted sum of two samples, there is no need of a clipping operation.

VVC also supports intra prediction with multiple reference lines (MRL) and intra prediction with sub-partitions (ISP). In MRL, the usual top and left reference arrays are said to constitute the $1^{st}$ reference line, where the nth reference line consists of reference arrays at an offset of n pixels from the target block. Besides the $1^{st}$ reference line, MRL also considers the $2^{nd}$ and the $4^{th}$ reference lines for making the prediction. The index of the reference line, denoted by the flag multiRefIdx, is signalled so that the decoder also uses the same reference line for prediction. If multiRefIdx flag is non-zero, that is, either the $2^{nd}$ or the $4^{th}$ reference line is used for prediction, then the useFilter flag is disabled, meaning that the predictors for Luma blocks are interpolated as in Eqn. (2) using the specified cubic filter. Thus, although for ease of explanation, "neighboring" reference samples as used herein might refer to the usual top and left reference arrays, e.g., samples of the first reference line, "neighboring" is not limited thereto and can refer to to other reference lines or arrays.

In ISP, a target block is divided into 2 or 4 sub-partitions, either vertically or horizontally. The predictions of sub-partitions are made in a sequential order so that the prediction in one sub-partition may use the decoded pixels in the previous sub-partition. In other words, the reference arrays for each sub-partition are constructed using the decoded pixels in the previous sub-partition. The type of partitioning is signaled with a flag called ispMode. ISP is supported only with the $1^{st}$ reference line. Therefore, if the multiRefIdx flag is non-zero, the target block is not partitioned. If the ispMode flag is non-zero, then the useFilter flag is enabled if the prediction direction is vertical (that is, the mode index is greater than or equal to 34) and the target block width is greater than 8, or if the prediction direction is horizontal (that is, the mode index is smaller than 34) and the target block height is greater than 8; otherwise the useFilter flag is disabled. In the former case, the predictors are interpolated using the specified Gaussian filter as in Eqn. (1), and in the latter case, they are interpolated using the specified cubic filter as in Eqn. (2).

In general, an approach to intra prediction in accordance with the present disclosure will now be described. In at least one embodiment, a single unified method of interpolation is applied to both Luma and Chroma components. For interpolating predictors with non-diagonal directions, the same four nearest reference samples P0, P1, P2, and P3, are considered as given in the previous section. For predictions along diagonal directions (i.e., for modes 2, 66, and 34), a prediction method such as that in VTM 5.0 can be used.

First, to distinguish between the two cases when the flag useFilter is enabled (a Gaussian filter is used in VTM 5.0), and when it is disabled (a cubic filter is used in VTM 5.0), the relatively low complexity [1 2 1]/4 filter can be applied to P1 and P2 when useFilter is enabled, else they are derived as in the previous section. This auxiliary step is necessary as the reference arrays used for predictions along non-diagonal directions are unfiltered.

Thus, if useFilter flag is true:

$$P1=(\text{refMain}[x+\text{deltaInt}]+2*\text{refMain}[x+\text{deltaInt}+1]+\text{refMain}[x+\text{deltaInt}+2]+2)\gg 2;$$

$$P2=(\text{refMain}[x+\text{deltaInt}+1]+2*\text{refMain}[x+\text{deltaInt}+2]+\text{refMain}[x+\text{deltaInt}+3]+2)\gg 2;$$

In general, an aspect of the present disclosure involves the predictor sample value being computed as:

$$P_{pred}(x,y)=\text{Clip}(P1+((((P2-P1)\ll 2)*\text{deltaFract}+(P1+P2-P0-P3)*\text{deltaFract2}+64)\gg 7)) \quad (4)$$

where deltaFract2=deltaFract if deltaFract<16=32−deltaFract, otherwise

In general, another aspect of the present disclosure involves first comparing the absolute value of the difference between P1 and P2 with a pre-set threshold. If the value is less than the threshold, we perform linear interpolation using P1 and P2, else we interpolate as above. Thus, denoting the preset threshold by Th, If $|(P1-P2)|<=Th$ $$P_{pred}(x,y)=(P1*(32-\text{deltaFract})+P2*\text{deltaFract}+16)\gg 5;$$

Else $$P_{pred}(x,y)=\text{Clip}(P1+((((P2-P1)\ll 2)*\text{deltaFract}+(P1+P2-P0-P3)*\text{deltaFract2}+64)\gg 7))$$

The derivation of the expression in Eqn. (4) is given in the following section.

The prediction formula can be derived as follows. Let $f(x)$ denote a 1-dimensional signal which has been sampled at integral values of x. Let p0, p1, p2, and p3 denote the sampled values at the co-ordinates x=−1, 0, 1, and 2, respectively. A cubic interpolation involves first modelling $f(x)$ as a third order polynomial as:

$$f(x)=ax^3+bx^2+cx+d.$$

The four coefficients a, b, c, d can be solved with four conditions:

$$f(0)=p1$$

$$f(1)=p2$$

$$f'(0)=(p2-p0)/2$$

$$f'(1)=(p3-p1)/2$$

where $f'(t)$ denotes the derivative of $f(x)$ at x=t. These are not the unique conditions, but the derivative conditions lead to the continuity and smoothness of $f(x)$ at $f(0)$ and $f(1)$. The resulting polynomial is also known as the Catmull-Rom spline.

An aspect of the present disclosure involves starting with a quadratic model as:

$$f(x)=ax^2+bx+c \quad (5)$$

Considering the first three samples at x=−1, 0, and 1, the following conditions are used to solve the coefficients a, b, and c.

$$f(0)=p1;$$

$$f(1)=p2;$$

$$f'(0)=(p2-p0)/2;$$

Substituting the values x=0, 1 in Eqn. (5) results in:

$$c=p1$$

$$a+b+c=p2$$

As $f'(x)=2ax+b,$ $$f'(0)=b=(p2-p0)/2;$$

Thus, the coefficients a, b, and c can be solved as:

$$a=p2-((p2-p0)/2+p1)=(p0+p2-2p1)/2;$$

$$b=(p2-p0)/2;$$

$$c=p1;$$

Substituting these values in the expression for $f(x)$ (Eqn. (5)), and then simplifying provides:

$$f(x) = \left(\frac{p0+p2-2p1}{2}\right)x^2 + \left(\frac{p2-p0}{2}\right)x + p1 =$$
$$\left(\frac{p0+p2-2p1}{2}\right)x^2 + \left(\frac{2p1-p0-p2}{2}\right)x + p1 + (p2-p1)x =$$
$$(x(1-x)/2)(2p1-p2-p0) + p1 + (p2-p1)x$$

Re-ordering the terms produces $$f(x) = p1 + (p2-p1)x + \frac{x(1-x)}{2}(2p1-p2-p0) =$$
$$(1-x)p1 + xp2 + \frac{x(1-x)}{2}(2p1-p2-p0)$$

If there were only the two samples p1 and p2, then the best function $f(x)$ to interpolate values in-between them would be the linear function:

$$f(x)=(1-x)p1+xp2.$$

As can be seen above, using a quadratic function with three samples results in a deviation from the linear function by the third term:

$$\frac{x(1-x)}{2}(2p1-p2-p0).$$

This deviation is a result of taking the third sample p0 into account. If now the three samples at x=0, 1, and 2, are used then the result will be a similar function given as:

$$f(x) = (1-x)p1 + xp2 + \frac{x(1-x)}{2}(2p2-p1-p3).$$

Thus, the deviation from the linear approximation, because of taking the third sample p3 into account, is:

$$\frac{x(1-x)}{2}(2p2-p1-p3).$$

Including the deviations caused by both p0 and p3, the final approximation becomes:

$$f(x) =$$
$$(1-x)p1 + xp2 + \frac{x(1-x)}{2}(2p1-p2-p0) + \frac{x(1-x)}{2}(2p2-p1-p3) =$$
$$(1-x)p1 + xp2 + \frac{x(1-x)}{2}(p1+p2-p0-p3).$$

Compared to the cubic formulation, the described result provides a much less complex approximation of the function that can be used to interpolate values in the interval [0 1]. This formulation can be further simplified with piece-wise linear approximations, as shown in the following.

The function $f(x)$ can be decomposed into two parts: one part consisting of the first two terms and the second part consisting of the third term alone.

$$f(x) = f_{linear}(x) + f_{quadratic}(x) \text{ where}$$

$$f_{linear} \equiv (1-x)p1 + xp2,$$

$$f_{quadratic} \equiv \frac{x(1-x)}{2}(p1+p2-p0-p3).$$

Figure 5:
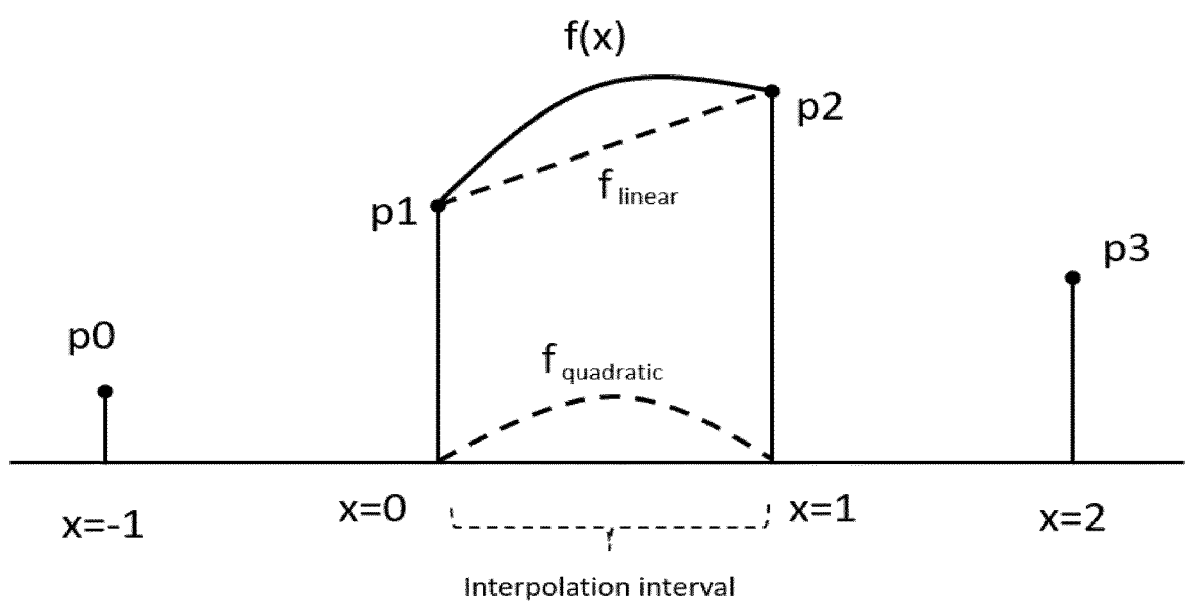
FIG. 5 illustrates an example of Quadratic function approximation with four samples, e.g., the function can be deposed into a linear part and a quadratic part.

These two functions are shown in FIG. 5.

It can be observed that the quadratic function has its maximum or minimum value at x=½ depending on if (p1+p2−p0−p3) is positive or negative. The value of the function $f(x)$ at x=½ is equal to $$\frac{p1+p2}{2} + \frac{p1+p2-p0-p3}{8}.$$

Figure 6:
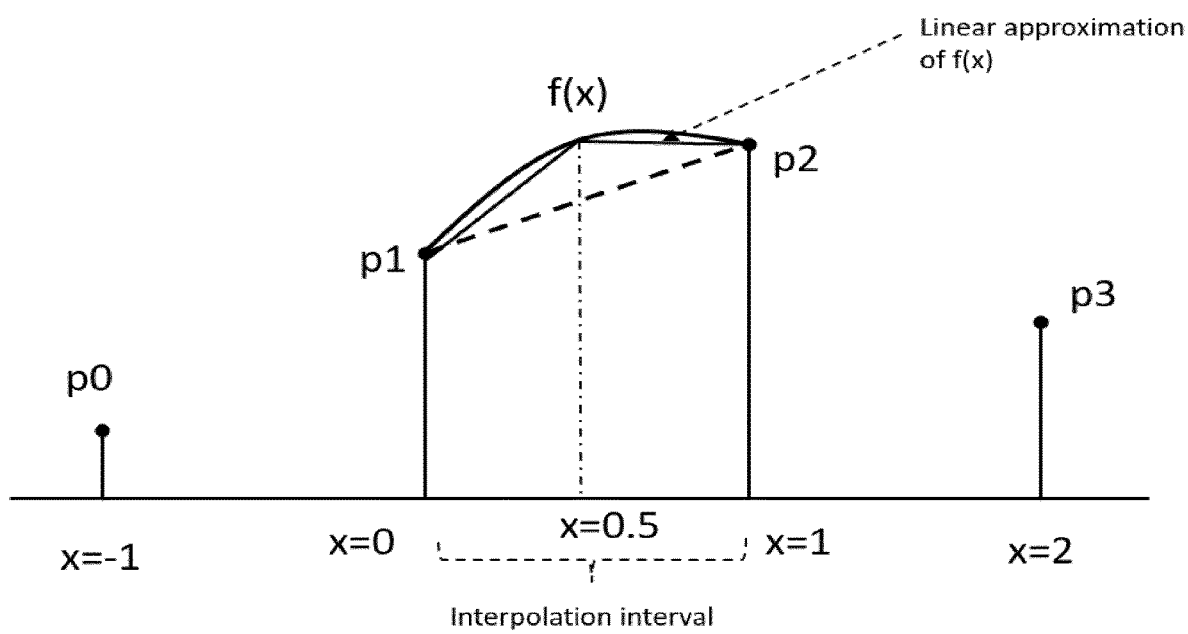
FIG. 6 illustrates an example of piece-wise linear approximation of a quadratic function, e.g., in each half of the interval [0, 1], the function is approximated with a straight line, where the slope of the line depends on the four given sample values p0, p1, p2, and p3.

The parabola can be linearly approximated by two lines, one extending from x=0 to x=½, and another from x=½ to x=1. This is shown in FIG. 6.

Thus, the function $f(x)$ can be given as $$f(x) = (1-x)p1 + xp2 + \frac{(p1+p2-p0-p3)}{4}x, \quad (6)$$
$$0 \le x < 1/2 = (1-x)p1 + xp2 + \frac{(p1+p2-p0-p3)}{4}(1-x),$$
$$\frac{1}{2} \le x < 1$$

The above equation can be re-expressed as $$f(x) = p1 + \frac{(p2-p1)4x + (p1+p2-p0-p3)x}{4}, \quad (7)$$
$$0 \le x < 1/2 = p1 + \frac{(p2-p1)4x + (p1+p2-p0-p3)(1-x)}{4},$$
$$\frac{1}{2} \le x \le 1$$

For the present application in intra prediction, x=(deltaFract/32). Now, substituting P0, P1, P2, P3 for p0, p1, p2, p3 in the above equation, provides the interpolated values as:

$$P =$$
$$P1 + \frac{((P2-P1) \ll 2)*deltaFract + (P1+P2-P0-P3)*deltaFract}{128},$$
$$0 \le deltaFract < 16 = P1 + \frac{((P2-P1) \ll 2)*deltaFract + (P1+P2-P0-P3)(32-deltaFract)}{128},$$
$$16 \le deltaFract < 32$$

where P denotes the interpolated value. Now using the variable deltaFract2 which is equal to deltaFract if deltaFract<16 and is equal to 32−deltaFract, if deltaFract≥16, and for rounding to the nearest integer, the above equation can be re-expressed more compactly as:

$$P = P1 + \frac{((P2-P1) \ll 2)*deltaFract + (P1+P2-P0-P3)*deltaFract2 + 64}{128} =$$
$$P1 + ((((P2-P1) \ll 2)*deltaFract + (P1+P2-P0-P3)*deltaFract2 + 64) \gg 7).$$

Since it is required to keep the interpolated value within the dynamic range of the signal, we need to clip the value to the required range in case the value falls outside the range:

P=Clip(P1+((((P2−P1)«2)*deltaFract+(P1+P2−P0−P3)*deltaFract2+64)»7)).

Note that the expression in Eqn. (6) can also be rewritten to have only one multiplication instead of 2:

$$f(x) = p1 + \frac{(p2-p1)4 + (p1+p2-p0-p3)}{4}x,$$
$$0 \le x < 1/2 = p2 + \frac{(p1-p2)4 + (p1+p2-p0-p3)}{4}(1-x),$$
$$\frac{1}{2} \le x \le 1$$

Following the substitution as above with x=(deltaFract/32), provides $$P =$$
$$Clip\left(P1 + \frac{(((P2-P1) \ll 2) + (P1+P2-P0-P3))*deltaFract2 + 64}{128}\right),$$
$$0 \leq deltaFract < 16 =$$
$$Clip\left(P2 + \frac{(((P1-P2) \ll 2) + (P1+P2-P0-P3))*deltaFract2 + 64}{128}\right),$$
$$16 \leq deltaFract < 32$$

In general, the above-described example based on a quadratic model and four reference samples can be described as using the model with the first three samples and then with the second three samples (the middle two samples are common to the first three samples and the second three samples) and then taking the average. This corresponds to a double quadratic model, but applied on four samples.

In the following, various examples of embodiments are described that include the interpolation methods presented above and some related variations. For ease of description, the examples of embodiments provided herein are described in the context of a VVC VTM 5.0 codec with 67 intra prediction modes. Except the interpolation of predictors for modes with non-diagonal directions, all other intra prediction parameters are assumed to remain unchanged. Therefore, in all the following embodiments, only the intra prediction angular modes along non-diagonal directions are considered. As stated, the use of such context is for ease of description and is intended to be merely by way of example and is non-limiting.

In at least one example of an embodiment referred to herein as "Embodiment 1", the predictor values are interpolated for both Luma and Chroma target blocks always using at least four neighboring reference samples, such as in Eqn. (4) above.

Figure 8:
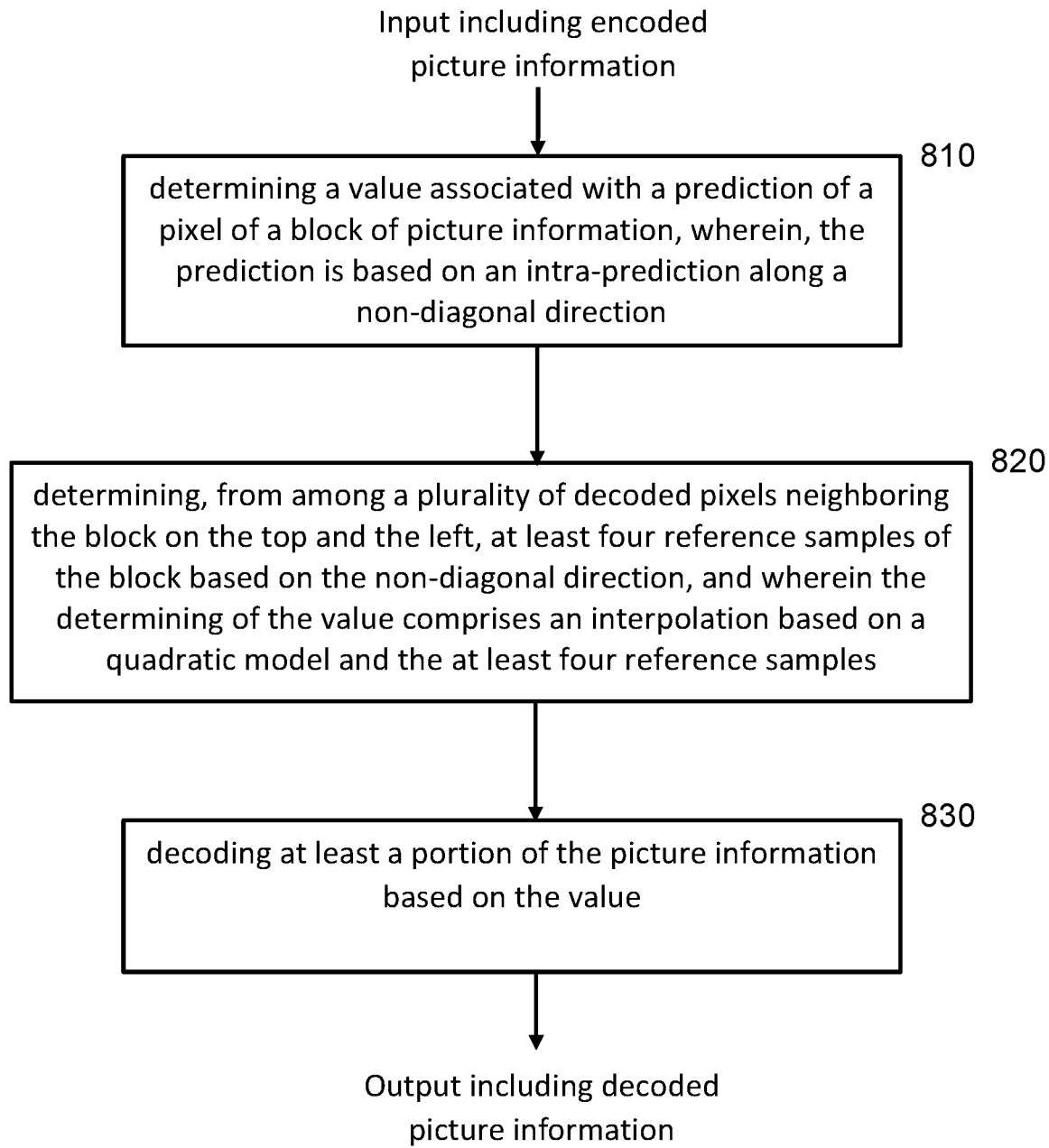
FIG. 8 illustrates an example of an embodiment in accordance with the present disclosure.

An example of Embodiment 1 is illustrated in FIG. 8. In FIG. 8, at 810, an input including picture information is processed to determine a value associated with a prediction of a pixel of a block of picture information wherein the prediction is based on an intra-prediction along a non-diagonal direction. For example, the value could be a predictor value or a value of a predictor sample associated with an intra-prediction angular mode along a non-diagonal direction). The block of picture information could be, for example, a block of luma or chroma information. Then, at 820, at least four reference samples for the block are determined among a plurality of decoded pixels neighboring the block on the top and the left. The at least four reference samples are determined based on the non-diagonal direction such as in the general direction of the non-diagonal direction from the pixel of the block. For example, the at least four reference samples can be four of the plurality of decoded neighboring pixels nearest to a predictor sample, e.g., two on each side of the predictor sample location. As discussed above, "neighboring" can refer to the usual reference arrays at the left and above the block, e.g., the first row above, or may refer to other reference arrays, e.g., other rows. Determining the value, e.g., the value of the predictor sample, comprises an interpolation based on a quadratic model and the at least four reference samples as described herein. Then, at 830, at least a portion of the picture information, e.g., the current block, is decoded based on the value to produce decoded picture information.

The example of an embodiment illustrated in FIG. 8 can also apply to encoding or an encoder. For application to encoding or an encoder, modifications to the embodiment illustrated in FIG. 8 include that the input to 810 would provide picture information to be encoded, e.g., a current block of picture information. Also, at 830 at least a portion of the picture information would be encoded based on the value to produce picture information.

In at least one other example of an embodiment referred to herein as "Embodiment 2", the predictor values for both Luma and Chroma target blocks are interpolated using either the two neighboring reference samples or the at least four reference samples. The decision is made by comparing the absolute value of the difference of the two nearest reference samples with a preset threshold. If the absolute difference is smaller than the threshold, then only the two nearest reference samples are used to linearly interpolate the predictor. Else, all the four nearest reference samples are used to interpolate the predictor, as in Embodiment 1. The thresholds used for Luma and Chroma can have identical or different values determined heuristically or experimentally or be determined based on any other objective or subjective measures.

In at least one other example of an embodiment referred to herein as "Embodiment 3", the predictor values are interpolated for only the Luma target blocks as in Embodiment 1 or Embodiment 2. The predictors for Chroma target blocks are always linearly interpolated.

In at least one other example of an embodiment referred to herein as "Embodiment 4", intra prediction is performed as in Embodiment 1-3, but instead of using two piece-wise linear approximations, the quadratic function approximation is used directly. The second order term (x(1−x)/2) with x=(deltaFract/32) can be computed offline and stored as a 1-dimensional array of 32 elements, or its computation can be combined with the linear terms.

In at least one other example of an embodiment referred to herein as "Embodiment 5", intra prediction is performed as in Embodiment 1-3, but instead of using a quadratic function approximation, the quadratic term is replaced with any other smooth function such as sinusoidal or logarithmic terms. This term can be computed offline for different values of deltaFract and stored as a 1-dimensional array of 32 elements.

In at least one other example of an embodiment referred to herein as "Embodiment 6", operation proceeds as in any one of the embodiments 1-5 but as an optional feature, wherein the option of using the described interpolation is signaled in a slice/tile header indicating that all CUs in the slice/tile use the particular interpolation method.

In at least one other example of an embodiment referred to herein as "Embodiment 7", operation proceeds as in any one of the embodiments 1-5 but as an optional feature, wherein the option of using the described interpolation is signaled in the Picture Parameter Set (PPS) indicating that all CUs in a frame use this interpolation method.

In at least one other example of an embodiment referred to herein as "Embodiment 8", operation proceeds as in any one of the embodiments 1-5 but as an optional feature, wherein the option of using the described interpolation is signaled in the Sequence Parameter Set (SPS) indicating that all CUs in the sequence use this interpolation method.

Systems in accordance with one or more embodiments described herein involving video coding and/or decoding can provide one or more of the following non-limiting examples of features individually or combined in various arrangements:

reduced complexity filtering method for interpolating the predictor values for non-diagonal directions excluding the strictly horizontal and strictly vertical directions;

filtering is applied to the four nearest samples but is based on two linear models, where each model applies to half of the interval.

the resulting calculations provide reduced complexity requiring only two multiplications per target pixel;

since models based on four samples are not appropriate for modeling edges of objects, a thresholding method can be used to decide between an interpolation model described herein and the usual linear interpolation with nearest two reference samples;

if the prediction requires the usage of pre-filtered reference samples, depending on the prediction direction and block size, then the usual [1 2 1] pre-filter is applied to the nearest two reference samples followed by interpolation as described herein;

a single unified interpolation method can be applied in all cases.

both Luma and Chroma components can have the same interpolation method;

filtered and unfiltered reference samples are treated in a uniform manner;

no additional memory is required to store the Gaussian and cubic filter coefficients;

improved coding performance and reduced complexity.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 7 described below provide some embodiments, but other embodiments are contemplated and the discussion of FIGS. 1, 2 and 7 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules of a video encoder and/or decoder such as intra prediction modules 160 of encoder 100 shown in FIGS. 1 and 260 of decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 7:
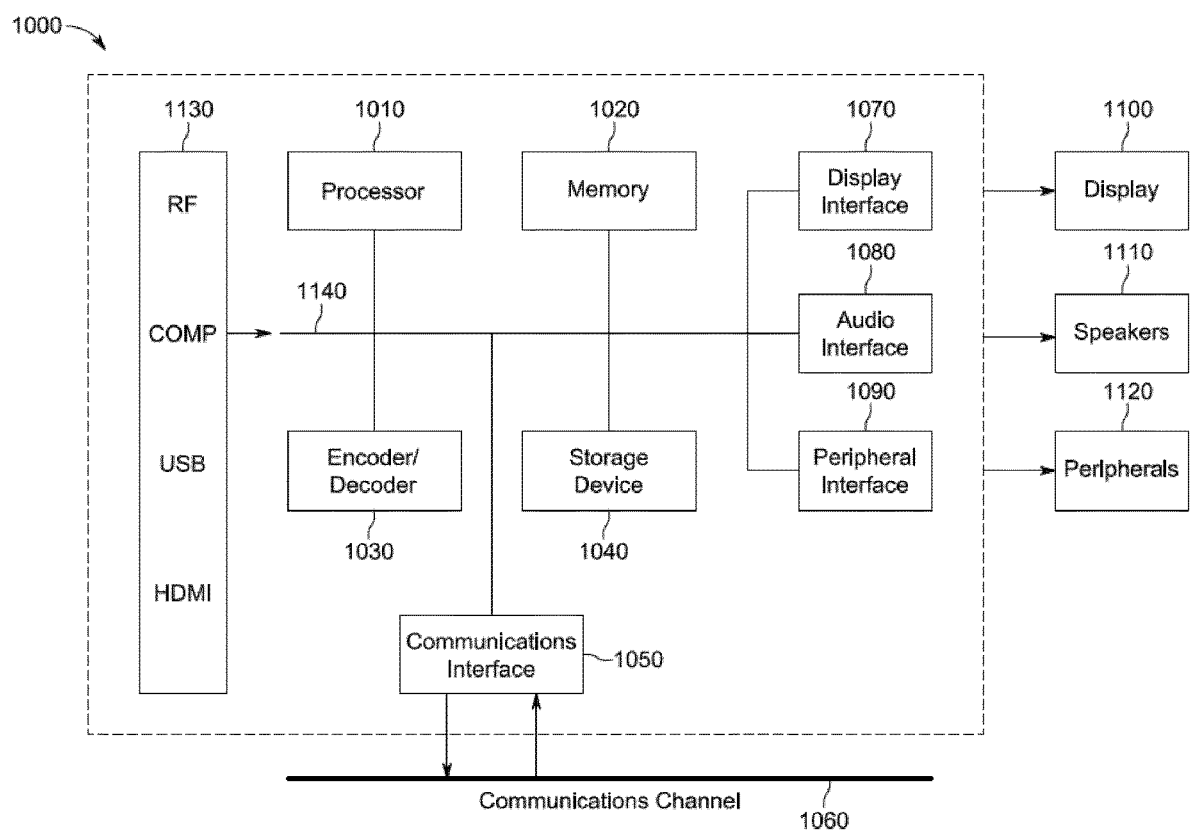
FIG. 7 provides a block diagram illustrating an example of an embodiment of apparatus or a system in accordance with various aspects and embodiments described herein.

FIG. 7 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", "one or more of", and "at least one of", for example, in the cases of "A/B", "A and/or B", "one or more of A or B" and "at least one of A and B", is intended to encompass the selection of the first listed option (A) only, or the selection of the second listed option (B) only, or the selection of both options (A and B). As a further example, in the cases of "A, B, and/or C", "one or more of A, B or C", and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, an example of an embodiment can involve a method comprising: determining a value associated with a prediction of a pixel of a block of picture information, wherein, the prediction is based on an intra-prediction along a non-diagonal direction, determining, from among a plurality of decoded pixels neighboring the block on the top and the left, at least four reference samples for the block based on the non-diagonal direction, and wherein the determining of the value comprises an interpolation based on a quadratic model and the at least four reference samples; and decoding at least a portion of the picture information based on the value.

In general, another example of an embodiment can involve a method comprising: determining a value associated with a prediction of a pixel of a block of picture information, wherein, the prediction is based on an intra-prediction along a non-diagonal direction, determining, from among a plurality of pixels neighboring the block on the top and the left, at least four reference samples for the block based on the non-diagonal direction, and wherein the determining of the value comprises an interpolation based on a quadratic model and the at least four reference samples; and encoding at least a portion of the picture information based on the value.

In general, another example of an embodiment can involve apparatus comprising: one or more processors configured to determine a value associated with a prediction of a pixel of a block of picture information, wherein, the prediction is based on an intra-prediction along a non-diagonal direction, determine, from among a plurality of decoded pixels neighboring the block on the top and the left, at least four reference samples for the block based on the non-diagonal direction, and wherein the one or more processors being configured to determine the value comprises the one or more processors being further configured to perform an interpolation based on a quadratic model and the at least four reference samples; and decode at least a portion of the picture information based on the value.

In general, another example of an embodiment can involve apparatus comprising: one or more processors configured to determine a value associated with a prediction of a pixel of a block of picture information, wherein, the prediction is based on an intra-prediction along a non-diagonal direction, determine, from among a plurality of pixels neighboring the block on the top and the left, at least four reference samples for the block based on the non-diagonal direction, and wherein the one or more processors being configured to determine the value comprises the one or more processors being further configured to perform an interpolation based on a quadratic model and the at least four reference samples; and encoding at least a portion of the picture information based on the value.

In general, another example of an embodiment can involve a method comprising: determining a value associated with predicting a pixel of a block of picture information, wherein, responsive to an intra-prediction mode for the block being an angular mode along a non-diagonal direction, determining, from among a plurality of decoded neighboring pixels on the top and the left of the block, at least four reference samples for the block based on the non-diagonal direction associated with the angular mode, and wherein the determining of the value comprises an interpolation based on a quadratic model and the at least four reference samples; and decoding at least a portion of the picture information based on the value.

In general, another example of an embodiment can involve a method comprising: determining a value associated with predicting a pixel of a block of picture information, wherein, responsive to an intra-prediction mode for the block being an angular mode along a non-diagonal direction, determining, from among a plurality of neighboring pixels on the top and the left of the block, at least four reference samples for the block based on the non-diagonal direction associated with the angular mode, and wherein the determining of the value comprises an interpolation based on a quadratic model and the at least four reference samples; and encoding at least a portion of the picture information based on the value.

In general, another example of an embodiment can involve apparatus comprising: one or more processors configured to determine a value associated with predicting a pixel of a block of picture information, wherein, responsive to an intra-prediction mode for the block being an angular mode along a non-diagonal direction, determine, from among a plurality of decoded neighboring pixels on the top and the left of the block, at least four reference samples for the block based on the non-diagonal direction associated with the angular mode, and wherein the one or more processors being configured to determine the value comprises the one or more processors being further configured to perform an interpolation based on a quadratic model and the at least four reference samples; and decode at least a portion of the picture information based on the value.

In general, another example of an embodiment can involve apparatus comprising: one or more processors configured to determine a value associated with predicting a pixel of a block of picture information, wherein, responsive to an intra-prediction mode for the block being an angular mode along a non-diagonal direction, determine, from among a plurality of neighboring pixels on the top and the left of the block, at least four reference samples for the block based on the non-diagonal direction associated with the angular mode, and wherein the one or more processors being configured to determine the value comprises the one or more processors being configured to perform an interpolation based on a quadratic model and the at least four reference samples; and encode at least a portion of the picture information based on the value.

In general, another example of an embodiment can involve a method comprising: determining that a prediction mode of a block of picture information corresponds to an intra-prediction angular mode along a non-diagonal direction; determining, from among a plurality of decoded pixels neighboring the block on the top and the left of the block, at least four reference samples based on the non-diagonal direction; determining a value associated with prediction of a pixel included in the block based on an interpolation using the at least four reference samples and a quadratic model; and decoding at least a portion of the picture information based on the value.

In general, another example of an embodiment can involve a method comprising: determining that a prediction mode of a block of picture information corresponds to an intra-prediction angular mode along a non-diagonal direction; determining, from among a plurality of pixels neighboring the block on the top and the left of the block, at least four reference samples based on the non-diagonal direction; determining a value associated with prediction of a pixel included in the block based on an interpolation using the at least four reference samples and a quadratic model; and encoding at least a portion of the picture information based on the value.

In general, another example of an embodiment can involve apparatus comprising: one or more processors configured to determine that a prediction mode of a block of picture information corresponds to an intra-prediction angular mode along a non-diagonal direction; determine, from among a plurality of decoded pixels neighboring the block on the top and the left of the block, at least four reference samples based on the non-diagonal direction; determine a value associated with prediction of a pixel included in the block based on an interpolation using the at least four reference samples and a quadratic model; and decode at least a portion of the picture information based on the value.

In general, another example of an embodiment can involve apparatus comprising: one or more processors configured to determine that a prediction mode of a block of picture information corresponds to an intra-prediction angular mode along a non-diagonal direction; determine, from among a plurality of pixels neighboring the block on the top and the left of the block, at least four reference samples based on the non-diagonal direction; determine a value associated with prediction of a pixel included in the block based on an interpolation using the at least four reference samples and a quadratic model; and encode at least a portion of the picture information based on the value.

In general, another example of an embodiment can involve a method or apparatus as described herein, wherein an interpolation is based on a function comprising a linear portion and a quadratic portion.

In general, another example of an embodiment can involve a method or apparatus as described herein, wherein an interpolation is based on a piecewise linear approximation of a quadratic portion of a function.

In general, another example of an embodiment can involve a method or apparatus as described herein, wherein a piecewise linear approximation comprises first and second piecewise linear approximations.

In general, another example of an embodiment can involve a method or apparatus as described herein, wherein determining at least four reference samples comprises: determining a location of a predictor sample neighboring the current block and in the non-diagonal direction from the pixel, wherein a value associated with prediction is associated with the predictor sample; determining, from among a plurality of pixels neighboring a block, locations of four pixels nearest the location of the predictor sample, two on each side of the location of the predictor sample, wherein each of the four nearest pixels corresponds to one of the at least four reference samples.

In general, another example of an embodiment can involve a method or apparatus as described herein further comprising determining, from among the at least four reference samples, two reference samples nearest to the location of a predictor sample, one on each side of the location of the predictor sample; determining an absolute value of a difference between the values of the two nearest reference samples; and comparing the absolute value of the difference with a threshold value.

In general, another example of an embodiment can involve a method or apparatus as described herein, wherein if an absolute value of a difference is less than a threshold value, then an interpolation is based only on two reference samples nearest a predictor sample, else the interpolation is based on at least four reference samples.

In general, another example of an embodiment can involve a method or apparatus as described herein, wherein a threshold value comprises a first threshold value and a second threshold value, and comparing an absolute value with a threshold value comprises comparing the absolute value with the first threshold value if a block of picture information comprises luma information, and comparing the absolute value with the second threshold value if the block of picture information comprises chroma information.

In general, another example of an embodiment can involve a method or apparatus as described herein, wherein a first threshold value is different from a second threshold value.

In general, another example of an embodiment can involve a method or apparatus as described herein, wherein a quadratic function comprises a quadratic function approximation.

In general, another example of an embodiment can involve a method or apparatus as described herein, wherein an interpolation is based on a function comprising a linear portion and a smooth function comprising a sinusoidal term or a logarithmic term.

In general, another example of an embodiment can involve a method or apparatus as described herein, wherein use of interpolation as described herein is signaled in a bitstream produced by encoding or received for decoding in at least one of the following portions of the bitstream: a slice/tile header indicating that all coding units in the slice/tile use the interpolation as claimed, or a Picture Parameter Set (PPS) indicating that all coding units in a frame use the interpolation as claimed, or a Sequence Parameter Set (SPS) indicating that all coding units in the sequence use the interpolation as claimed.

In general, another example of an embodiment can involve a bitstream formatted to include picture information, wherein the picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein.

In general, at least one example of an embodiment can involve a computer program product including instructions, which, when executed by a computer, cause the computer to carry out a method in accordance with one or more examples of embodiments described herein.

In general, at least one example of an embodiment can involve a non-transitory computer readable medium storing executable program instructions to cause a computer executing the instructions to perform a method in accordance with one or more examples of embodiments described herein.

In general, at least one example of an embodiment can involve a signal comprising data generated according to any one or more examples of embodiments described herein.

In general, at least one example of an embodiment can involve a bitstream, formatted to include syntax elements and encoded image information generated in accordance with any one or more of the examples of embodiments described herein.

In general, at least one example of an embodiment can involve a computer readable storage medium having stored thereon a bitstream generated according to methods or apparatus described herein.

In general, at least one example of an embodiment can involve transmitting or receiving a bitstream or signal generated according to methods or apparatus described herein.

In general, at least one example of an embodiment can involve a device comprising an apparatus in accordance with any one or more of the examples of embodiments described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

Various embodiments have been described. Embodiments may include any of the following features or entities, alone or in any combination, across various different claim categories and types:

Providing in an encoder and/or decoder for the predictor values being interpolated for both Luma and Chorma target blocks always using at least four neighboring reference samples, such as in Eqn. (4) above;

Providing in an encoder and/or decoder for the predictor values being interpolated for both Luma and Chorma using either the two neighboring reference samples or the at least four reference samples, based on a decision being made by comparing the absolute value of the difference of the two nearest reference samples with a preset threshold, wherein if the absolute difference is smaller than the threshold, then only the two nearest reference samples are used to linearly interpolate the predictor, else all the four nearest reference samples are used to interpolate the predictor, as in Embodiment 1, and wherein the thresholds used for Luma and Chroma can have identical or different values determined heuristically or experimentally, or based on any other objective or subjective measures;

Providing in an encoder and/or decoder for the predictor values being interpolated for the Luma target blocks as in either example above and the predictor values for Chroma target blocks are linearly interpolated;

Providing in an encoder and/or decoder for performing intra prediction as in any of the examples above, wherein instead of using two piece-wise linear approximations, the quadratic function approximation is used directly;

Providing in an encoder and/or decoder for performing intra prediction as in any of the examples above, wherein instead of using two piece-wise linear approximations, the quadratic function approximation is used directly, and wherein the second order term (x(1−x)/2) with x=(deltaFract/32) can be computed offline and stored as a 1-dimensional array of 32 elements, or its computation can be combined with the linear terms;

Providing in an encoder and/or decoder for performing intra prediction as in any of the first three examples above, wherein instead of using a quadratic function approximation, the quadratic term is replaced with any other smooth function such as sinusoidal or logarithmic terms;

Providing in an encoder and/or decoder for performing intra prediction as in any of the first three examples above, wherein instead of using a quadratic function approximation, the quadratic term is replaced with any other smooth function such as sinusoidal or logarithmic terms, and wherein this term can be computed offline for different values of deltaFract and stored as a 1-dimensional array of 32 elements.

Providing in an encoder and/or decoder for performing intra prediction as in any of the examples above, wherein a particular interpolation is signaled in a slice/tile header indicating that all CUs in the slice/tile use the particular interpolation method;

Providing in an encoder and/or decoder for performing intra prediction as in any of the examples above, wherein a particular interpolation is signaled in a Sequence Parameter Set (SPS) indicating that all CUs in the sequence use the particular interpolation method;

Providing in an encoder and/or decoder for performing intra prediction as in any of the examples above, wherein a particular interpolation is signaled in a Picture Parameter Set (PPS) indicating that all CUs in a frame use the particular interpolation method;

Providing in an encoder and/or decoder for performing intra prediction in accordance with any of the embodiments, features or entities, alone or in any combination, as described herein based on providing reduced complexity and/or improved compression efficiency;

Inserting in the signaling syntax elements that enable the encoder and/or decoder to provide encoding and/or decoding in accordance with any of the embodiments, features or entities, alone or in any combination, as described herein;

Selecting, based on these syntax elements, the features or entities, alone or in any combination, as described herein to apply at the decoder;

A bitstream or signal that includes one or more of the described syntax elements, or variations thereof;

Inserting in the signaling syntax elements that enable the decoder to provide decoding in a manner corresponding to the manner of encoding used by an encoder;

Creating and/or transmitting and/or receiving and/or decoding a bitstream or signal that includes one or more of the described syntax elements, or variations thereof;

A TV, set-top box, cell phone, tablet, or other electronic device that provides for applying encoding and/or decoding according to any of the embodiments, features or entities, alone or in any combination, as described herein;

A TV, set-top box, cell phone, tablet, or other electronic device that performs encoding and/or decoding according to any of the embodiments, features or entities, alone or in any combination, as described herein, and that displays (e.g. using a monitor, screen, or other type of display) a resulting image;

A TV, set-top box, cell phone, tablet, or other electronic device that tunes (e.g. using a tuner) a channel to receive a signal including an encoded image, and performs encoding and/or decoding according to any of the embodiments, features or entities, alone or in any combination, as described herein;

A TV, set-top box, cell phone, tablet, or other electronic device that receives (e.g. using an antenna) a signal over the air that includes an encoded image, and performs encoding and/or decoding according to any of the embodiments, features or entities, alone or in any combination, as described herein;

A computer program product storing program code that, when executed by a computer encoding and/or decoding in accordance with any of the embodiments, features or entities, alone or in any combination, as described herein;

A non-transitory computer readable medium including executable program instructions causing a computer executing the instructions to implement encoding and/or decoding in accordance with any of the embodiments, features or entities, alone or in any combination, as described herein.

Various other generalized, as well as particularized embodiments are also supported and contemplated throughout this disclosure.

The invention claimed is:

1. A method comprising:
 determining a value associated with a prediction of a pixel of a block of picture information, the block of picture information having a top and a left, wherein the prediction is based on an intra-prediction along a non-diagonal direction,
 determining, from among a plurality of decoded pixels neighboring the block on the top and the left, at least four reference samples for the block based on the non-diagonal direction, wherein the determining of the value comprises an interpolation based on a quadratic model and the at least four reference samples, the quadratic model comprising a linear portion and a quadratic portion, and the quadratic portion being based on a piecewise linear approximation; and
 decoding at least a portion of the picture information based on the value.

2. The method of claim 1, wherein the prediction being based on an intra-prediction along a non-diagonal direction corresponds to an intra-prediction mode of the block being an angular mode along a non-diagonal direction.

3. The method of claim 1, wherein determining the at least four reference samples comprises:
 determining a location of a predictor sample neighboring the block and in the non-diagonal direction from the pixel, wherein the value is associated with the predictor sample;
 determining, from among the plurality of decoded pixels neighboring the block, locations of four pixels nearest the location of the predictor sample, two pixels on each side of the location of the predictor sample, wherein each of the four pixels nearest the location of the predictor sample corresponds to one of the at least four reference samples.

4. The method of claim 3, further comprising
   determining, from among the at least four reference samples, two reference samples nearest to the location of the predictor sample, one on each side of the location of the predictor sample;
   determining an absolute value of a difference between the values of the two reference samples nearest to the location of the predictor sample; and
   comparing the absolute value of the difference with a threshold value.

5. The method of claim 4, wherein if the absolute value of the difference is less than the threshold value, then the interpolation is based only on the two reference samples nearest to the location of the predictor sample, else the interpolation is based on the at least four reference samples.

6. The method of claim 4, wherein
   the threshold value comprises a first threshold value and a second threshold value, and
   comparing the absolute value of the difference with the threshold value comprises:
   comparing the absolute value with the first threshold value if the block of picture information comprises luma information, and
   comparing the absolute value with the second threshold value if the block of picture information comprises chroma information.

7. The method of claim 1, wherein the interpolation is based on a function comprising a linear portion and a smooth function comprising a sinusoidal term or a logarithmic term.

8. The method of claim 1, wherein use of the interpolation is signaled in a bitstream produced by encoding or received for decoding in at least one of:
   a slice header associated with a slice, the slice header indicating that all coding units in the slice use the interpolation as claimed, or
   a Picture Parameter Set (PPS) indicating that all coding units in a frame use the interpolation as claimed, or
   a Sequence Parameter Set (SPS) indicating that all coding units in a sequence use the interpolation as claimed.

9. A method comprising:
   determining a value associated with a prediction of a pixel of a block of picture information, the block of picture information having a top and a left, wherein the prediction is based on an intra-prediction along a non-diagonal direction,
   determining, from among a plurality of pixels neighboring the block on the top and the left, at least four reference samples for the block based on the non-diagonal direction, and wherein the determining of the value comprises an interpolation based on a quadratic model and the at least four reference samples, the quadratic model comprising a linear portion and a quadratic portion, and the quadratic portion being based on a piecewise linear approximation; and
   encoding at least a portion of the picture information based on the value.

10. Apparatus comprising:
    one or more processors configured to
    determine a value associated with a prediction of a pixel of a block of picture information, the block of picture information having a top and a left, wherein the prediction is based on an intra-prediction along a non-diagonal direction,
    determine, from among a plurality of decoded pixels neighboring the block on the top and the left, at least four reference samples for the block based on the non-diagonal direction, and wherein the one or more processors being configured to determine the value comprises the one or more processors being further configured to perform an interpolation based on a quadratic model and the at least four reference samples, the quadratic model comprising a linear portion and a quadratic portion, and the quadratic portion being based on a piecewise linear approximation; and
    decode at least a portion of the picture information based on the value.

11. The apparatus of claim 10, wherein the prediction being based on an intra-prediction along a non-diagonal direction corresponds to an intra-prediction mode of the block being an angular mode along a non-diagonal direction.

12. The apparatus of claim 10, wherein the one or more processors being configured to determine the at least four reference samples comprises the one or more processors being further configured to:
    determine a location of a predictor sample neighboring the block and in the non-diagonal direction from the pixel, wherein the value is associated with the predictor sample;
    determine, from among the plurality of decoded pixels neighboring the block, locations of four pixels nearest the location of the predictor sample, two pixels on each side of the location of the predictor sample, wherein each of the four pixels nearest the location of the predictor sample corresponds to one of the at least four reference samples.

13. The apparatus of claim 12, wherein the one or more processors are further configured to
    determine, from among the ate least four reference samples, two reference samples nearest to the location of the predictor sample, one on each side of the location of the predictor sample;
    determine an absolute value of a difference between the values of the two reference samples nearest to the location of the predictor sample; and
    compare the absolute value of the difference with a threshold value.

14. The apparatus of claim 13, wherein if the absolute value of the difference is less than the threshold value, then the interpolation is based only on the two reference samples nearest to the location of the predictor sample, else the interpolation is based on the at least four reference samples.

15. The apparatus of claim 13, wherein
    the threshold value comprises a first threshold value and a second threshold value, and
    the one or more processors being configured to compare the absolute value of the difference with the threshold value comprises the one or more processors being configured to:
    compare the absolute value with the first threshold value if the block of picture information comprises luma information, and
    compare the absolute value with the second threshold value if the block of picture information comprises chroma information.

16. The apparatus of claim 10, wherein the interpolation is based on a function comprising a linear portion and a smooth function comprising a sinusoidal term or a logarithmic term.

17. The apparatus of claim 10, wherein use of the interpolation is signaled in a bitstream produced by encoding or received for decoding in at least one of:
    a slice header associated with a slice, the slice header indicating that all coding units in the slice use the interpolation as claimed, or a Picture Parameter Set (PPS) indicating that all coding units in a frame use the interpolation as claimed, or a Sequence Parameter Set (SPS) indicating that all coding units in a sequence use the interpolation as claimed.

18. Apparatus comprising:

one or more processors configured to determine a value associated with a prediction of a pixel of a block of picture information, the block of picture information having a top and a left, wherein the prediction is based on an intra-prediction along a non-diagonal direction, determine, from among a plurality of pixels neighboring the block on the top and the left, at least four reference samples for the block based on the non-diagonal direction, and wherein the one or more processors being configured to determine the value comprises the one or more processors being further configured to perform an interpolation based on a quadratic model and the at least four reference samples, the quadratic model comprising a linear portion and a quadratic portion, and the quadratic portion being based on a piecewise linear approximation; and encoding at least a portion of the picture information based on the value.

* * * * *